US012589305B2

(12) United States Patent
Zhang

(10) Patent No.: US 12,589,305 B2
(45) Date of Patent: Mar. 31, 2026

(54) LEVEL SCREEN DISPLAY METHOD, APPARATUS, DEVICE AND STORAGE MEDIUM

(71) Applicant: Tencent Technology (Shenzhen) Company Limited, Shenzhen (CN)

(72) Inventor: Chennan Zhang, Shenzhen (CN)

(73) Assignee: Tencent Technology (Shenzhen) Company Limited (CN)

( * ) Notice: Subject to any disclaimer, the term of this patent is extended or adjusted under 35 U.S.C. 154(b) by 590 days.

(21) Appl. No.: 17/965,088

(22) Filed: Oct. 13, 2022

(65) Prior Publication Data

US 2023/0031248 A1     Feb. 2, 2023

Related U.S. Application Data

(63) Continuation of application No. PCT/CN2022/072327, filed on Jan. 17, 2022.

(30) Foreign Application Priority Data

Jan. 21, 2021    (CN) .......................... 202110084242.3

(51) Int. Cl.
A63F 13/52          (2014.01)
A63F 13/533        (2014.01)
(Continued)

(52) U.S. Cl.
CPC .............. *A63F 13/55* (2014.09); *A63F 13/52* (2014.09); *A63F 13/533* (2014.09); *A63F 13/837* (2014.09); *A63F 13/92* (2014.09)

(58) Field of Classification Search
CPC ........ A63F 13/55; A63F 13/52; A63F 13/533; A63F 13/837; A63F 13/92
See application file for complete search history.

(56) References Cited

U.S. PATENT DOCUMENTS 8,365,076 B2 *    1/2013   Hamilton, II ......... A63F 13/533
                                                                    715/706
9,192,860 B2 *   11/2015  Shuster ................... A63F 13/35
                          (Continued)

FOREIGN PATENT DOCUMENTS

CN           104065637 A        9/2014
CN           106582020 A        4/2017
                 (Continued)

OTHER PUBLICATIONS

Chinese Office Action for Chinese Patent Application No. 2021100842423 dated Aug. 4, 2022, including an English Concise Explanation (12 pages).

(Continued)

*Primary Examiner* — David L Lewis
*Assistant Examiner* — Shauna-Kay Hall
(74) *Attorney, Agent, or Firm* — Crowell & Moring LLP

(57)          ABSTRACT

A level screen displaying method, apparatus, device and storage medium, falling within the field of application programs supporting a virtual environment, is applied to a terminal device, a level provided by the terminal device including at least two sub-levels. The method including: displaying the level screen, the level screen displaying a virtual character located in a first sub-level (320); controlling the virtual character to move in the first sub-level in response to a moving operation (340); loading a second sub-level in response to the virtual character moving to a trigger position of the second sub-level in the first sub-level (360); and controlling the virtual character to move from the first sub-level to the second sub-level (380). According to this application, a terminal only needs to load level resources of a part of the sub-levels in the running process, without loading all level resources of the whole level at the same (Continued)

time, thereby reducing higher requirements on computing performance and cache resources of the mobile terminal.

20 Claims, 8 Drawing Sheets

(51) Int. Cl.
  *A63F 13/55* (2014.01)
  *A63F 13/837* (2014.01)
  *A63F 13/92* (2014.01)

(56) References Cited

U.S. PATENT DOCUMENTS

| | | | |
|---|---|---|---|
| 12,019,837 B2 * | 6/2024 | Lu .......................... | A63F 13/428 |
| 2007/0060388 A1 | 3/2007 | Stelzer et al. | |
| 2012/0028700 A1 * | 2/2012 | Avent ................... | A63F 13/537 |
| | | | 463/43 |
| 2012/0214591 A1 * | 8/2012 | Ito ......................... | A63F 13/211 |
| | | | 463/31 |
| 2018/0207524 A1 * | 7/2018 | Babieno .................. | A63F 13/25 |
| 2018/0213055 A1 * | 7/2018 | Liangliang ............ | H04L 67/568 |

FOREIGN PATENT DOCUMENTS

| | | |
|---|---|---|
| CN | 109523621 A | 3/2019 |
| CN | 109889656 A | 6/2019 |
| CN | 111035932 A | 4/2020 |
| CN | 111729306 A | 10/2020 |
| CN | 112717386 A | 4/2021 |
| JP | 2000-102670 A | 4/2000 |
| JP | 2018-97614 A | 6/2018 |
| JP | 2020039947 A | 3/2020 |

OTHER PUBLICATIONS

GKPank, "Santa and the Curse of the Pirates Complete Collection Clearance Process Phase 4", Bilibili.com, Jun. 22, 2020, https://www.bilibili.com/video/BV1WK4y147Zv, Relevant to claim No. 2-8 and 10-11, including English translation (2 pages).

Lao Tan, "UE4 scene streaming mechanism II: Level Streaming Volume & World Composition", Zhihu.com, Oct. 30, 2020, https://zhuanlan.zhihu.com/ p/270172506, Relevant to claim No. 6-7 and 10-11, including English translation (14 pages).

International Search Report and Written Opinion for PCT/CN2022/072327 mailed Apr. 13, 2022 including translation of International Search Report and Written Opinion (15 pages).

Japanese Office Action with English Translation, Mar. 13, 2024, pp. 1-10, issued in Japanese Application No. 2023-524478.

Japanese Office Action with English Translation, Aug. 16, 2024, pp. 1-14, issued in Japanese Application No. 2023-524478.

"Unreal Engine 4" 1$^{st}$ Edition, Born Digital Co., Ltd., Jul. 25, 2015, including English explanation of relevance (10 pages).

* cited by examiner

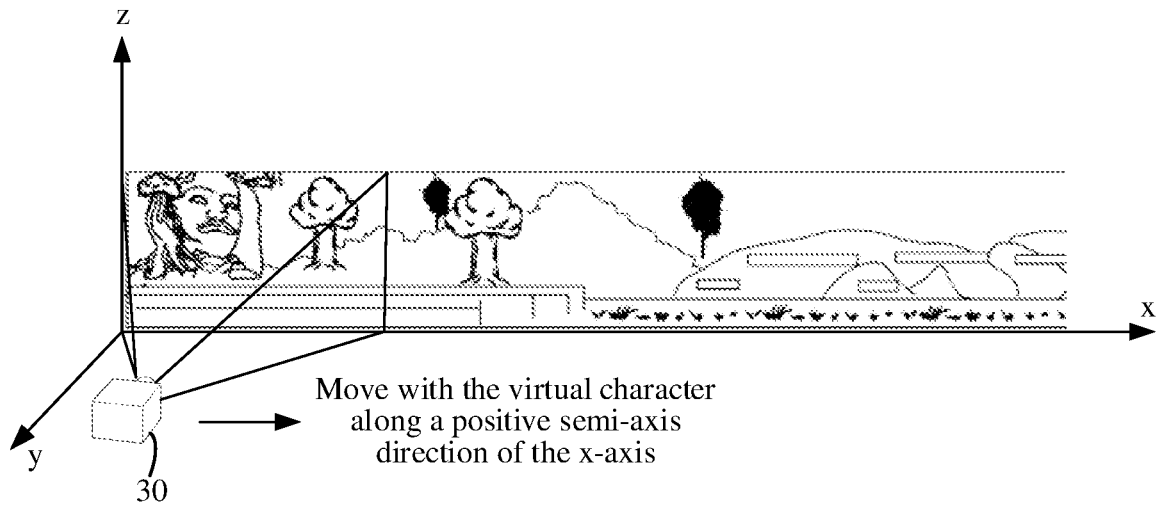

Move with the virtual character
along a positive semi-axis
direction of the x-axis

FIG. 7

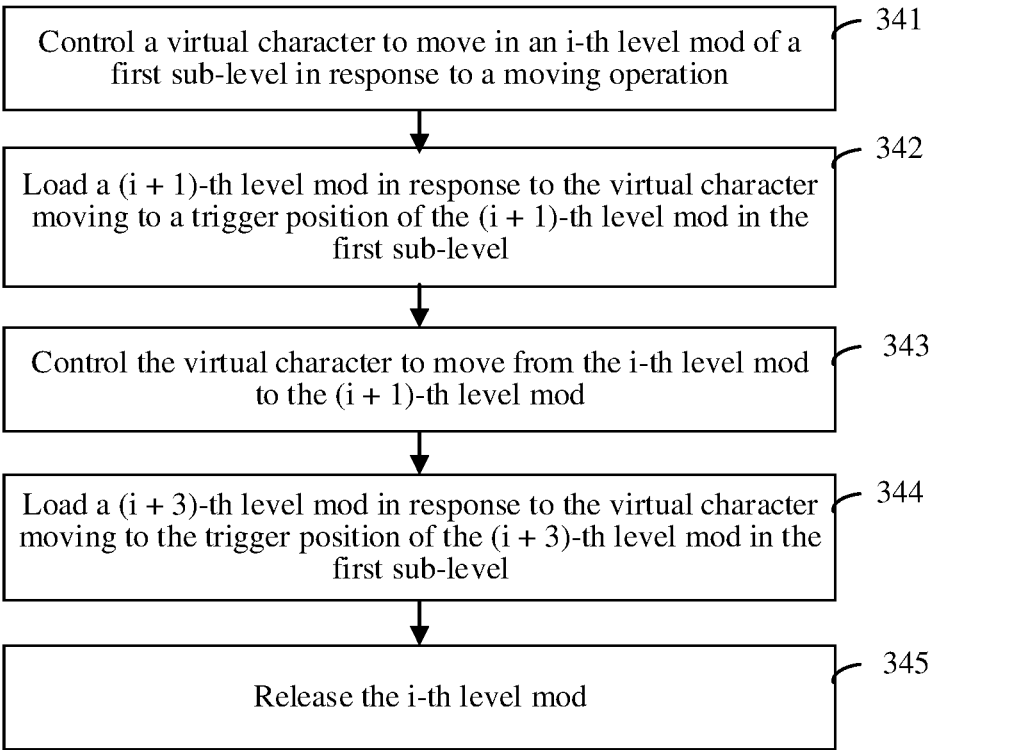

Control a virtual character to move in an i-th level mod of a
first sub-level in response to a moving operation — 341

Load a (i + 1)-th level mod in response to the virtual character
moving to a trigger position of the (i + 1)-th level mod in the
first sub-level — 342

Control the virtual character to move from the i-th level mod
to the (i + 1)-th level mod — 343

Load a (i + 3)-th level mod in response to the virtual character
moving to the trigger position of the (i + 3)-th level mod in the
first sub-level — 344

Release the i-th level mod — 345

FIG. 8

Virtual character
position 1

| Level mod 1 | Level mod 2 | Level mod 3 | Level mod 4 | Level mod 5 |
|---|---|---|---|---|

Virtual character
position 2

| Level mod 1 | Level mod 2 | Level mod 3 | Level mod 4 | Level mod 5 |
|---|---|---|---|---|

Virtual character
position 3

| Level mod 1 | Level mod 2 | Level mod 3 | Level mod 4 | Level mod 5 |
|---|---|---|---|---|

Start record
point          Record point 1          Level teleport
point

Start record point          Record point 1    Record point 2    Level

1 -1    1 -2

2 -1    2 -2    2 -3

Level 1

Computer device 1300

1

LEVEL SCREEN DISPLAY METHOD, APPARATUS, DEVICE AND STORAGE MEDIUM

RELATED APPLICATION

This application is a continuation of International Application No. PCT/CN2022/072327, filed Jan. 17, 2022, which claims priority to Chinese Patent Application No. 202110084242.3, entitled "LEVEL SCREEN DISPLAY METHOD, APPARATUS, DEVICE AND STORAGE MEDIUM" and filed with the China National Intellectual Property Administration on Jan. 21, 2021. The contents of International Application No. PCT/CN2022/072327 and Chinese Patent Application No. 202110084242.3 are each incorporated herein by reference in their entirety.

FIELD OF THE TECHNOLOGY

This application relates to the field of applications supporting the virtual environment and particularly relates to a level screen display method, apparatus, and device and storage medium.

BACKGROUND OF THE DISCLOSURE

There are multiple levels in a horizontal shooting game. The user controls a virtual character to move and shoot in a certain level to complete the level task of the level, so as to enter the next level until all levels are completed.

2D horizontal shooting games in the related art appeared on early game consoles. The screen of the 2D horizontal shooting game is a 2D screen. The content of the screen is relatively simple, so the length of each level is relatively long.

In event that the above-mentioned 2D horizontal shooting game is implemented as a 3D horizontal shooting game of a terminal, due to the high computing performance and cache resources required by the 3D horizontal shooting game, there will be technical difficulties in realizing a long level length.

SUMMARY

This application provides a level screen display method, apparatus, device and storage medium, which can reduce the performance requirements of a terminal by a long level length. The technical solutions are as follows:

According to an aspect of this application, provided is a method for displaying a level screen, applied to a terminal device, a level provided by the terminal device including at least two sub-levels, the method including:

displaying the level screen, the level screen displaying a virtual character located in a first sub-level;

controlling the virtual character to move in the first sub-level in response to a moving operation;

loading a second sub-level in response to the virtual character moving to a trigger position of the second sub-level in the first sub-level; and controlling the virtual character to move from the first sub-level to the second sub-level.

According to another aspect of this application, provided is an apparatus for displaying a level screen, a level provided by the apparatus including at least two sub-levels, the apparatus including:

a display module configured to display the level screen, the level screen displaying a virtual character located in a first sub-level;

an interaction module configured to control the virtual character to move in the first sub-level in response to a moving operation; and a load module configured to load a second sub-level in response to the virtual character moving to a trigger position of the second sub-level in the first sub-level; and where the interaction module is configured to control the virtual character to move from the first sub-level to the second sub-level.

In some implementations, the trigger position of the second sub-level is a tail position of the first sub-level; and the interaction module is configured to display settlement information about the first sub-level on the level screen in response to the virtual character passing the tail position of the first sub-level; and control the virtual character to keep moving until moving to the second sub-level.

In some implementations, the interaction module is configured to display, by using HUD information, pop-up prompt information, or prompt information that moves with the virtual character, settlement information about the first sub-level on the level screen in response to the virtual character passing the tail position of the first sub-level.

In some implementations, the display module is configured to display an adjacent position of the first sub-level and the second sub-level in the process of controlling the virtual character to move from the first sub-level to the second sub-level.

In some implementations, the first sub-level includes n level mods connected end-to-end, the level mods being basic units for composing the sub-levels;

the interaction module is configured to control the virtual character to move in an i-th level mod of the first sub-level in response to the moving operation;

the load module is configured to load a (i+1)-th level mod in response to the virtual character moving to the trigger position of the (i+1)-th level mod in the first sub-level; and the interaction module is configured to control the virtual character to move from the i-th level mod to the (i+1)-th level mod.

In some implementations, a distance between the trigger position of the second sub-level and a camp position of the first sub-level is less than a threshold, the camp position being a position in the last level mod of the first sub-level.

In some implementations, the load module is configured to release a historically loaded level mod in response to the historically loaded level mod satisfying a release condition.

In some implementations, the load module is configured to load a (i+3)-th level module in response to the virtual character moving to the trigger position of the (i+3)-th level mod in the first sub-level; and release the i-th level mod in a case of successfully loading the (i+3)-th level mod.

In some implementations, the first sub-level and the second sub-level respectively include at least one level mod; and the load module is configured to load a first level mod of the second sub-level in response to the virtual character moving to the trigger position of the second sub-level in the last level mod of the first sub-level.

According to an aspect of this application, a computer device is provided, including: a processor and a memory, the memory storing a computer program, the computer program being loaded and executed by the processor to perform the method for displaying a level screen.

According to another aspect of this application, a computer-readable storage medium is provided, storing a computer program, the computer program being loaded and executed by a processor to implement the method for displaying a level screen.

According to another aspect of this application, a chip is provided, including a programmable logic circuit and/or a program instruction, the chip being configured to be run on a computer device to implement the method for displaying a level screen.

According to another aspect of this application, a computer program product is provided, the computer program product including computer instructions, the computer instructions being stored in a computer-readable storage medium. A processor of a computer device reads the computer instructions from the computer-readable storage medium and executes the computer instructions to cause the computer device to perform the method for displaying a level screen provided in the foregoing aspect.

The technical solutions provided in the embodiments of this application produce at least the following beneficial effects:

By splitting a level into a plurality of sub-levels, in response to a virtual character moving to a trigger position of a second sub-level in a first sub-level, loading the second sub-level, a terminal only needs to load level resources of a part of the sub-levels in the running process, without loading all level resources of the whole level at the same time, thereby reducing higher requirements on computing performance and cache resources of the terminal.

BRIEF DESCRIPTION OF THE DRAWINGS

FIG. 7 illustrates an interface diagram of a method for displaying a level screen provided by an exemplary embodiment;

FIG. 8 illustrates a flowchart of a method for displaying a level screen provided by an exemplary embodiment;

DESCRIPTION OF EMBODIMENTS

Figure 1:
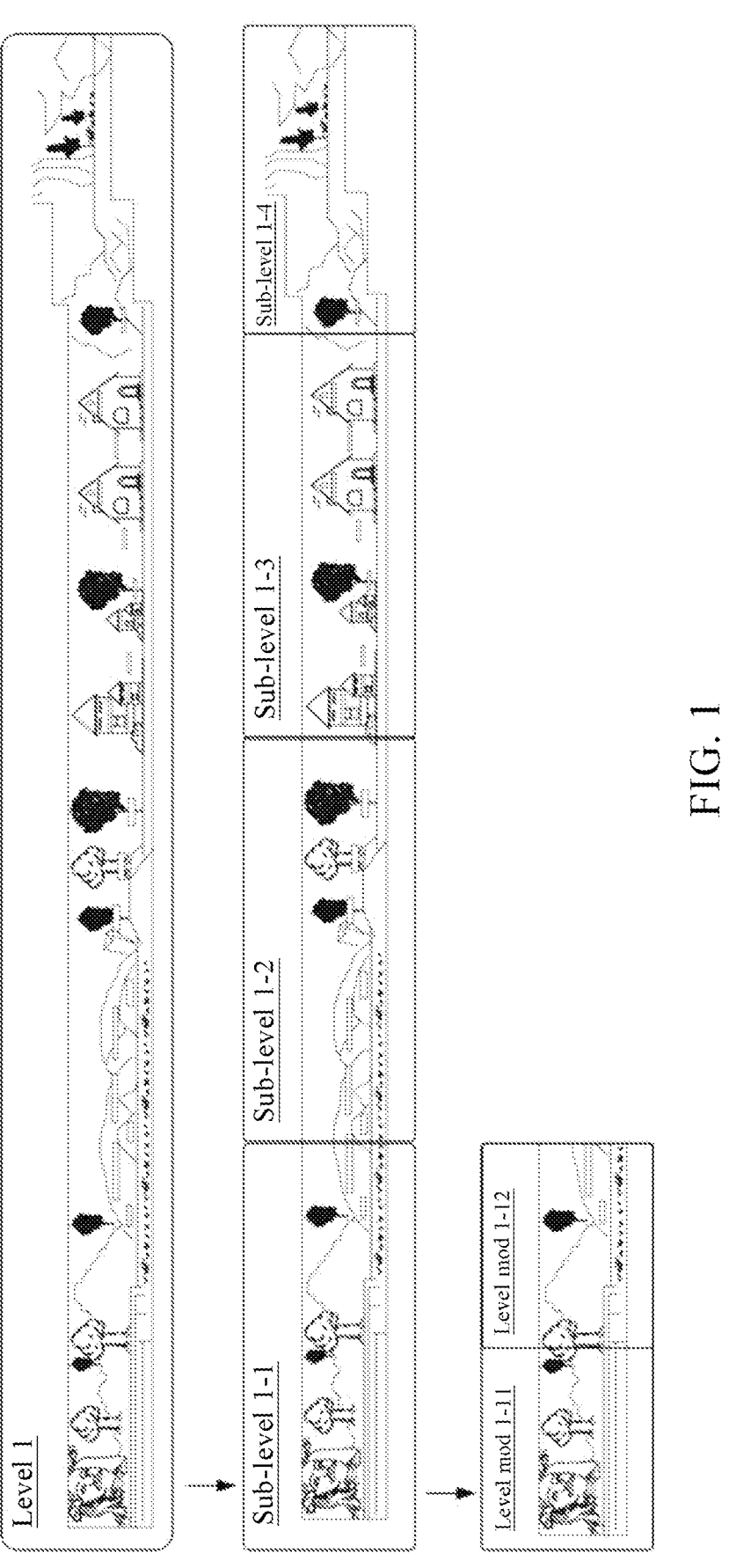
FIG. 1 illustrates a schematic diagram of a level organization mode provided by an exemplary embodiment.

First, terms involved in the embodiments of this application are introduced as follows:

Horizontal game: it refers to a game in which a moving route of a game character is controlled on a horizontal screen. The moving route of the game character is performed in a horizontal direction in all screens or most screens in the horizontal game. According to the content, the horizontal games can be divided into horizontal clearance, horizontal adventure, horizontal contending, horizontal policy and other games; According to the technique, the horizontal games can be divided into two-dimensional (2D) horizontal games and a three-dimensional (3D) horizontal games.

Virtual Environment: A virtual environment is displayed (or provided) by an application program when run on a terminal. The virtual environment may be a simulated environment of a real world, or may be a semi-simulated and semi-fictional environment, or may be a completely fictional environment. The virtual environment may be any one of a two-dimensional virtual environment, a 2.5-dimensional virtual environment, and a three-dimensional virtual environment. This is not limited in this application. A description is made by using an example in which the virtual environment is a three-dimensional virtual environment in the following embodiments.

Optionally, the virtual environment can provide a combat environment for the virtual character. By way of example, in a horizontal game, one or two virtual characters contend in a single game in a virtual environment. The virtual character achieves the purpose of surviving in the virtual environment by avoiding attacks launched by an enemy unit and dangers in the virtual environment (such as poison gas circles, swamps, and so on). When the life value of the virtual character in the virtual environment is zero, the life of the virtual character in the virtual environment ends. The virtual character that successfully passes the route in the level at last is the winner. Each client may control one or more virtual characters in the virtual environment. Optionally, arena modes of the battle may include a single-player battle mode, a two-player team battle mode, or a multi-player team battle mode. The battle mode is not limited in the embodiments of this embodiment.

By way of example, the level screen is a screen for viewing the virtual environment from the horizontal screen perspective of the virtual character, for example, a shooting game in which the virtual character is viewed vertically from the right-hand direction of the virtual character. The level screen refers to a horizontal level screen or a vertical level screen. The length of the horizontal level screen in the horizontal direction is not less than the length of the vertical direction, and the length of the vertical level screen in the horizontal direction is not greater than the length of the vertical direction. Optionally, the terminal supports switching between the vertical level screen and the horizontal level screen when displaying the level screen. For example, in a case that the length direction of the terminal is a horizontal direction, the terminal displays the horizontal level screen, and in a case that the length direction of the terminal changes to a vertical direction, the terminal switches the horizontal level screen to the vertical level screen. There is a difference in the display range of the virtual environment between the horizontal screens and the vertical screens. The above-mentioned switching process is a function provided by the client on the terminal. In the process of realizing the switching, the client can acquire information provided by a sensor of the terminal so as to determine the placement direction of the terminal, and then determine the current mode of displaying the level screen. By way of example, the sensor is referred to as a gyroscope sensor.

Virtual character A virtual character is a movable object in a virtual environment. The movable object may be a virtual character, a virtual animal, a cartoon character, or the like, such as a character, an animal, a plant, an oil drum, a wall, or a stone displayed in a three-dimensional virtual environment. Optionally, the virtual character is a three-dimensional model created based on a skeletal animation technology. Each virtual role has a respective shape and size in the 3D virtual environment, and occupies some space in the 3D virtual environment. The virtual character generally refers to one or more virtual characters in the virtual environment.

User Interface (UI) Control: It refers to any visual control or element that can be seen on the UI of an application, for example, a control such as a screen, an input box, a text box, a button, a label. Some UI controls respond to the user's operation, for example, the user can input text in the input box, and the user interacts with the UI by the UI controls.

Embodiments of this application provide a level organization mode in a horizontal game, where the game includes a plurality of levels, and each level is split into at least two sub-levels. With exemplary reference to FIG. 1, taking a level 1 as an example, the level 1 is split into four sub-levels: sub-level 1-1, sub-level 1-2, sub-level 1-3 and sub-level 1-4. Each sub-level has an independent level resource and each sub-level can settle and record independently.

By way of example, at least one sub-level in level 1 is split into at least two level mods. For example, sub-level 1-1 is split into a level mod 1-11 and a level mod 1-12. The level mod is a basic unit or a minimum unit when designing a level. Some level mods may be multiplexed between different levels to improve the design efficiency.

In the game process, the terminal can load resources according to sub-level granularity or level mod granularity to reduce the occupation of computing resources and cache resources.

Figure 2:
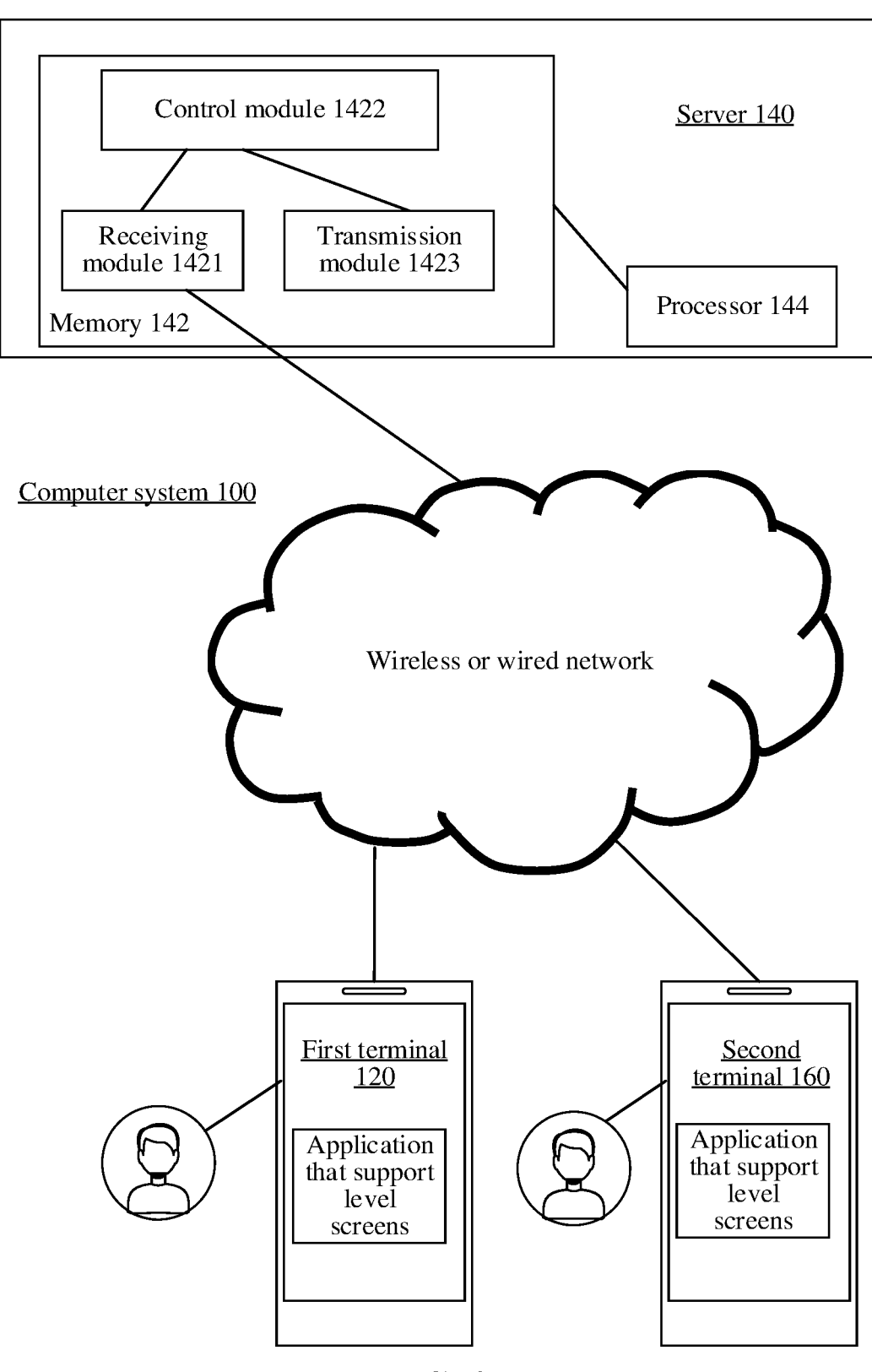
FIG. 2 illustrates a structure block diagram of a computer system provided by an exemplary embodiment.

FIG. 2 is a structural block diagram of a computer system according to an exemplary embodiment of this application. The computer system 100 includes a first terminal 120, a server 140, and a second terminal 160.

The first terminal 120 installs and runs an application supporting the virtual environment, and the application supports the level screen. The application may be any one of a 3D mapping program, a horizontal shooting, a horizontal adventure, a horizontal passing, a horizontal policy, a virtual reality (VR) application, and an augmented reality (AR) program. The first terminal 120 is a terminal used by a first user 301. The first user uses the first terminal 120 to control a first virtual character located in the virtual world to perform a movement. The movement includes, but is not limited to, at least one of body posture adjustment, walking, running, jumping, aiming, picking, using throwing props, and attacking other virtual characters. For example, the first virtual character is a first virtual person, for example, a simulated person object or a cartoon person object. By way of example, the first user controls the first virtual character to move by a UI control on the virtual environment screen.

The first terminal 120 is connected to the server 140 by using a wireless network or a wired network.

The server 140 includes at least one of one server, a plurality of servers, a cloud computing platform, and a virtualization center. For example, the server 140 includes a processor 144 and a memory 142. The memory 142 further includes a receiving module 1421, a control module 1422, and a transmission module 1423. The receiving module 1421 is configured to receive a request transmitted by a client, such as a team forming request; The control module 1422 is configured to control the rendering of the virtual environment screen; The transmission module 1423 is configured to transmit a response, such as prompt information about the success of teaming up, to the client. The server 140 is configured to provide a backend service for an application program supporting a three-dimensional virtual environment. Optionally, the server 140 undertakes the primary computing work, and the first terminal 120 and the second terminal 160 undertake the secondary computing work. Alternatively, the server 140 undertakes the secondary computing work, and the first terminal 120 and the second terminal 160 undertake the primary computing work. Alternatively, the server 140, first terminal 120, and the second terminal 160 perform collaborative computing based on a distributed computing architecture.

The second terminal 160 installs and runs an application supporting the virtual environment, and the application supports the level screen. The application may be any one of a 3D mapping program, a horizontal shooting, a horizontal adventure, a horizontal passing, a horizontal policy, a VR application, and an AR program. The second terminal 160 is a terminal used by a second user, and the second terminal 160 uses the second terminal 160 to control a second virtual character located in the virtual environment to perform a movement. This activity includes but is not limited to: at least one of body posture adjustment, walking, running, jumping, aiming, picking, using throwing props, and attacking other virtual characters. For example, the second virtual character is a second virtual person, for example, a simulated person object or a cartoon person object.

Optionally, the first virtual character and the second virtual character are located in the same virtual environment. Optionally, the first virtual character and the second virtual character may belong to the same team, the same organization, or the same camp have a friend relationship, or have a temporary communication permission. Optionally, the first virtual character and the second virtual character may also belong to different camps, different teams, or different organizations, or have a hostile relationship with each other.

Optionally, applications installed on the first terminal 120 and the second terminal 160 are the same, or the applications installed on the two terminals are the same type of applications on different operating system platforms (Android or IOS). The first terminal 120 may be generally one of a plurality of terminals, and the second terminal 160 may be generally one of a plurality of terminals. In this embodiment, only the first terminal 120 and the second terminal 160 are used for description. The first terminal 120 and the second terminal 160 are of the same device type or of different device types. The device type includes at least one of a smartphone, a tablet computer, an e-book reader, a Moving Picture Experts Group Audio Layer III (MP3) player, a Moving Picture Experts Group Audio Layer IV (MP4) player, a laptop, and a desktop computer. The following embodiment is described by using an example in which the terminal includes a smartphone.

A person skilled in the art may learn that there may be more or fewer terminals. For example, there may be only one terminal, or there may be dozens of or hundreds of terminals or more. The quantity and the device type of the terminals are not limited in the embodiments of this application.

Figure 3:
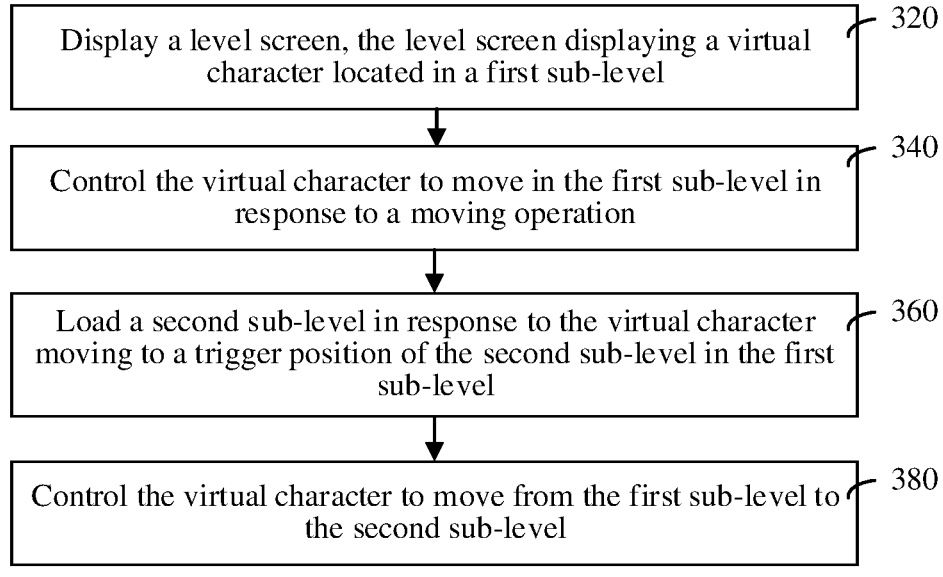
FIG. 3 illustrates a flowchart of a method for displaying a level screen provided by an exemplary embodiment.

FIG. 3 illustrates a flowchart of a method for displaying a level screen provided by an exemplary embodiment of this application; This embodiment is illustrated by applying the method to a terminal or application (also referred to as a client) shown in FIG. 2. The method includes:

Step 320: displaying the level screen, the level screen displaying a virtual character located in a first sub-level.

The level screen is a virtual environment screen displayed on a terminal where a client is located based on a 3D virtual environment. By way of example, in a case of running an application that supports a 3D virtual environment, the terminal may use a horizontal view to collect the virtual environment screens when a virtual character participates in an activity in the 3D virtual environment. The virtual environment screen is a screen when the virtual character performs an action in the activity. For example, if the activity is fighting, the virtual environment screen is a screen in which the virtual character is fighting. By way of example, the virtual environment displayed by the virtual environment screen includes: at least one element of mountains, flats, rivers, lakes, oceans, deserts, sky, plants, buildings, and vehicles.

Figure 4:
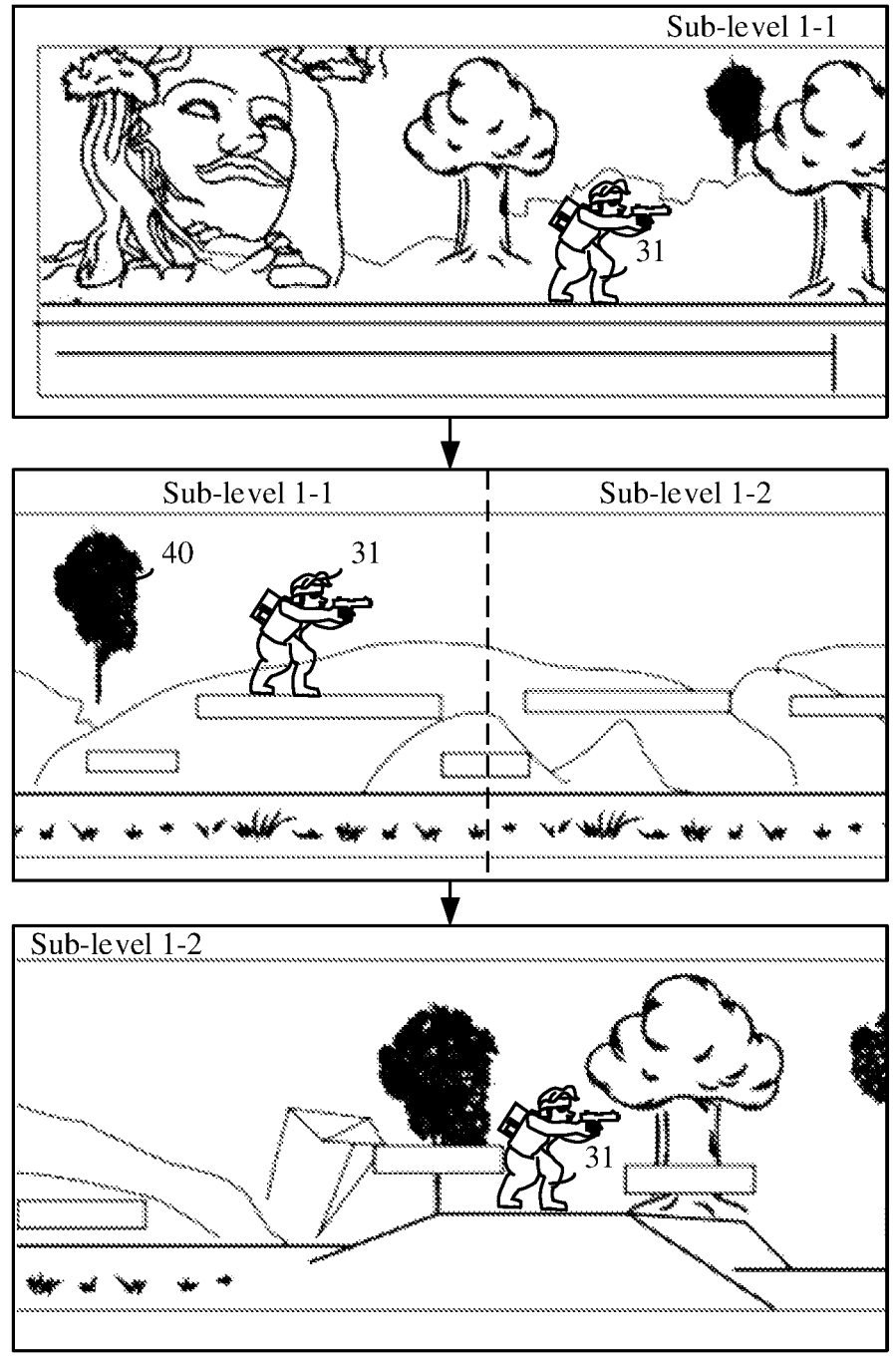
FIG. 4 illustrates an interface diagram of a method for displaying a level screen provided by an exemplary embodiment.

The virtual character located at the first sub-level is displayed on the level screen. Referring schematically to FIG. 4, a virtual environment of the sub-level 1-1 and the virtual character 31 located in the sub-level 1-1 are displayed on the level screen.

The level provided by the terminal includes at least two sub-levels. Optionally, the terminal provides levels and sub-levels through an installed client, and the client supports the display of level images. For example, the client is a horizontal shooting game. A plurality of sub-levels can compose a complete level. The client is provided with at least one complete level. During the running, the client can determine the displayed sub-level according to the currently stored clearance progress, or determine the displayed sub-level according to the selection operation. By way of example, the first sub-level is a sub-level of a stored progress indication or a sub-level selected by a selection operation.

Step 340: controlling the virtual character to move in the first sub-level in response to a moving operation.

The user controls the movement of the virtual character by a handle, keys, a mouse or a touchscreen. In response to a user-triggered moving operation, the terminal controls the virtual character to move in the first sub-level.

By way of example, the virtual character moves along a line of movement in a horizontal direction in a 3D virtual environment. The line of movement is simply referred to as a "moving line", and is a collection of points at which the virtual character can move in a 3D virtual environment. The moving line is represented by grassland, mud, desert, bridge and shallow pit on the level screen.

The moving line includes a moving line along a horizontal direction. The moving line at the same position can have two layers, namely, an upper layer and a lower layer, or, three layers, namely, an upper layer, a middle layer, and a lower layer. For example, the upper layer is the high platform moving line, the middle layer is the land moving line, and the lower layer is the shallow pit moving line. By way of example, there are some moving lines in local areas, which may be in other directions such as the vertical direction, and the 45-degree oblique direction, but are not completely in the horizontal direction, which is not limited in this embodiment.

Step 360: loading a second sub-level in response to the virtual character moving to a trigger position of the second sub-level in the first sub-level.

The trigger position of the second sub-level is set in the first sub-level. For example, the trigger position of the second sub-level is set at the end of the first sub-level. With exemplary reference to FIG. 4, the first sub-level is sub-level 1-1, and the black tree 40 in FIG. 4 is the trigger position of the second sub-level (sub-level 1-2).

In response to the virtual character moving in the first sub-level to the trigger position of the second sub-level, the terminal starts loading the second sub-level. After loading the level resource of the second sub-level, the terminal can display a level screen about the second sub-level based on the level resource of the second sub-level.

Step 380: controlling the virtual character to move from the first sub-level to the second sub-level.

In response to a user-triggered moving operation, the terminal controls the virtual character to move from the first sub-level to the second sub-level, or, in some automatic moving scenarios, the terminal controls the virtual character to automatically move from the first sub-level to the second sub-level. Optionally, the first sub-level is adjacent to the second sub-level. There is a transitional connection relationship between virtual environments of the first sub-level and the second sub-level. There is an adjacent position between the first sub-level and the second sub-level. For example, with continued reference to FIG. 4, the dashed position in FIG. 4 is the adjacent position of the first sub-level and the second sub-level. The process of the terminal controlling the movement of the virtual character from the first sub-level to the second sub-level according to the moving operation is performed continuously, and no pause occurs during the movement. In addition, during the movement, the terminal displays the above-mentioned adjacent position, in which case the level screen displayed by the terminal includes both a portion of the first sub-level and a portion of the second sub-level.

In summary, according to the method provided by the embodiment, by splitting a level into a plurality of sub-levels, in response to a virtual character moving to a trigger position of a second sub-level in a first sub-level, loading the second sub-level, a terminal only needs to load level resources of a part of the sub-levels in the running process, without loading all level resources of the whole level at the same time, thereby reducing higher requirements on computing performance and cache resources of the terminal.

Figure 5:
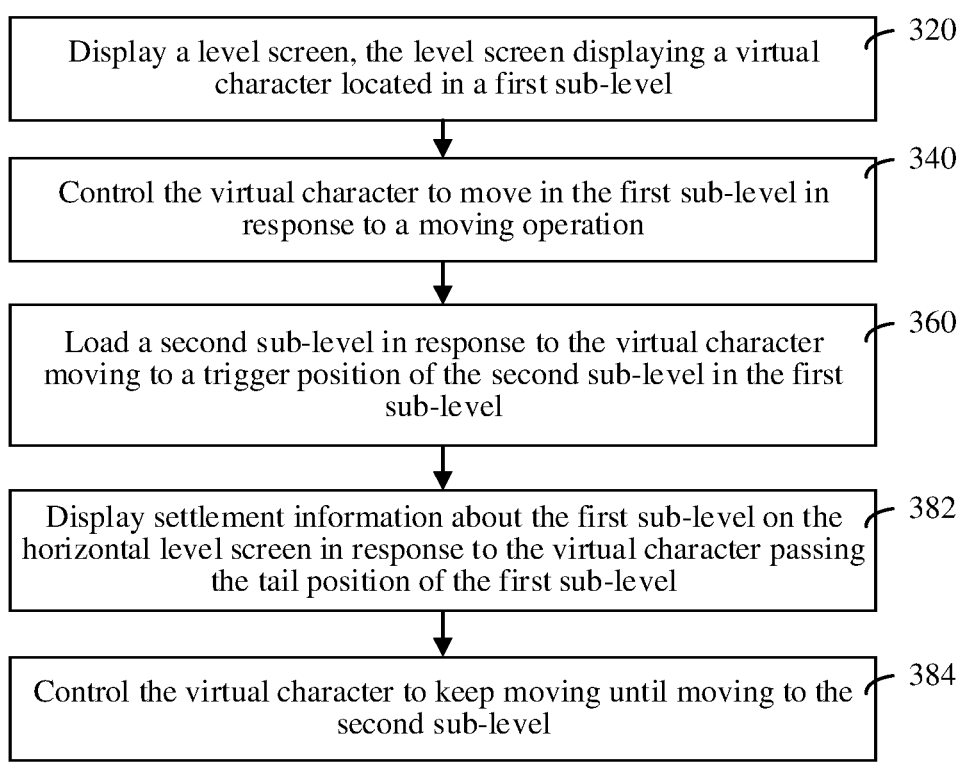
FIG. 5 illustrates a flowchart of a method for displaying a level screen provided by an exemplary embodiment.

FIG. 5 illustrates a flowchart of a method for displaying a level screen provided by an exemplary embodiment of this application; The present embodiment is illustrated by applying the method to a terminal or application (also referred to as a client) shown in FIG. 2. The method includes:

Step 320: displaying the level screen, the level screen displaying a virtual character located in a first sub-level.

Figure 6:
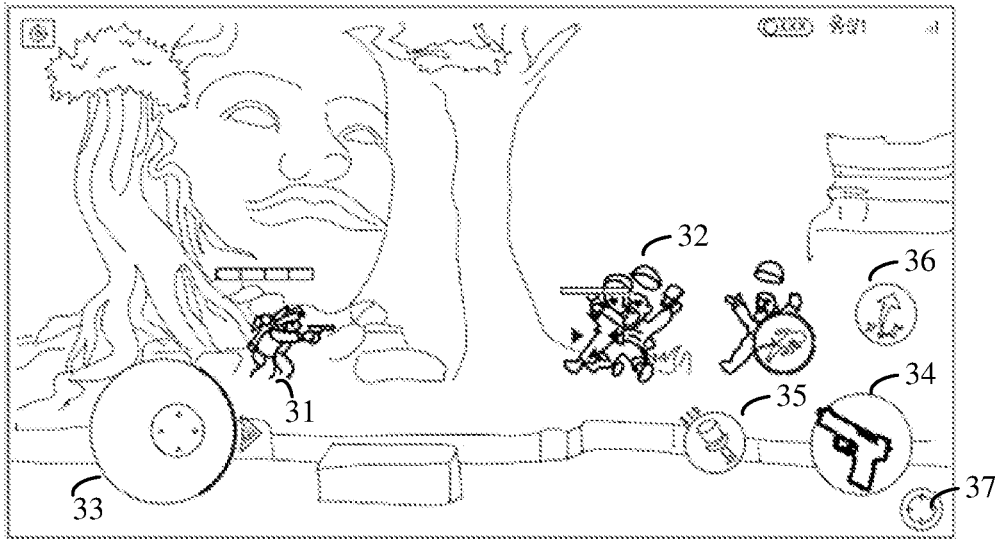
FIG. 6 illustrates an interface diagram of a method for displaying a level screen provided by an exemplary embodiment.

With exemplary reference to FIG. 6, the level screen shows a virtual character 31 controlled by a player and a plurality of enemy units 32. The virtual character 31 and the enemy unit 32 are located in a 3D virtual environment. The level screen is acquired by a camera model 30 set in the 3D virtual environment. With reference to FIG. 7, the acquisition direction of the camera model 30 is perpendicular to the x-axis. Assuming that the line of movement of the virtual character in the 3D virtual environment is in the positive x-axis direction of the world coordinate system, the level screen shown in FIG. 6 is acquired during the process of the camera model 30 adopting a horizontal view following the movement of the virtual character in the positive semi-axis direction of the x-axis.

By way of example, a UI control is superimposed and displayed on the level screen. The UI control includes a control for realizing a function of controlling the virtual character to perform an action; By way of example, the UI controls include at least one of a moving type UI control, an assist type UI control, an aiming type UI control, and a state switch type UI control.

The moving type UI control is configured to control the virtual character to move. For example, the direction movement control 33 shown in FIG. 6 belongs to the moving type UI control. When the direction movement control 33 is triggered, the virtual character moves forward, backward, left and right in the virtual environment.

The assist type UI control is configured to assist the virtual character in performing activities, such as a shooting control 34 and a grenade throwing control 35 shown in FIG. 6. The shooting control 34 is configured to control the virtual character to fire a bullet. The grenade throwing control 35 is configured to control the virtual character to grenade throwing prop.

The aiming type UI control is a control for switching an attack target of the virtual character, or a control for aiming at the attack target. For example, an aiming switch control 37 shown in FIG. 6 is a control for switching the attack target of the virtual character. By way of example, the client is provided with an automatic aiming mechanism that automatically aims an attack target for the virtual character based on at least one of the distance between the virtual character and the enemy unit, the blood volume of the enemy unit, and the type of the enemy unit. If the user is dissatisfied with the attack target aimed by the automatic aiming mechanism, the user can click the aiming switch control 37 to switch the attack target to the next highest priority enemy unit in an automatic aiming list.

Step 340: controlling the virtual character to move in the first sub-level in response to a moving operation.

The user controls the movement of the virtual character by a handle, keys, a mouse or a touchscreen. In response to a user-triggered moving operation, the terminal controls the virtual character to move in the first sub-level.

By way of example, the virtual character moves along a line of movement in a horizontal direction in a 3D virtual environment. The line of movement is simply referred to as a "moving line", and is a collection of points at which the virtual character can move in a 3D virtual environment. The moving line is represented by grassland, mud, desert, bridge and shallow pit on the level screen.

The moving line includes a moving line along a horizontal direction. The moving line at the same position can have two layers, namely, an upper layer and a lower layer, or, three layers, namely, an upper layer, a middle layer, and a lower layer. For example, the upper layer is the high platform moving line, the middle layer is the land moving line, and the lower layer is the shallow pit moving line. By way of example, there are some moving lines in local areas, which may be in other directions such as the vertical direction, and the 45-degree oblique direction, but are not completely in the horizontal direction, which is not limited in this embodiment.

Step 360: loading a second sub-level in response to the virtual character moving to a trigger position of the second sub-level in the first sub-level.

By way of example, the trigger position of the second sub-level is a tail position of the first sub-level. Optionally, the tail position is configured to trigger settlement of the first sub-level. The tail position is a position for triggering settlement and recording of a bureau parameter for at least one of money, points, experiences, rewards and props of the virtual character in the first sub-level. Optionally, the tail position is a position near the end position of the first sub-level, for example the distance between the tail position and the end position of the first sub-level is smaller than a distance threshold. A display element exists in the virtual environment to indicate the tail position. For example, the tail position is marked by a marking element with a preset color or preset shape. Typically, the tail position is located at an end position in the first sub-level.

With exemplary reference to FIG. 4, the black tree 40 in FIG. 4 is the trigger position of the second sub-level.

In response to the virtual character moving in the first sub-level to the trigger position of the second sub-level, the terminal starts loading the second sub-level. After loading the level resource of the second sub-level, the terminal can display a level screen about the second sub-level based on the level resource of the second sub-level.

The level resources of the sub-level include: logic resources and art resources.

Logical resources include code resources related to running logic. Logical resources include, but are not limited to: at least one of a triggering logic of an enemy unit, a movement logic of the enemy unit, an attack logic of the enemy unit, an appearance logic of a neutral unit, an action logic of the neutral unit, a release logic of a flight prop, a release logic of a ground vehicle, a release logic of a robot carrier, and a reward drop logic. The embodiments of this application do not define the specific types of logic resources.

The art resources include: model resources and map resources of a 3D virtual model. The 3D virtual model includes: at least one of buildings, grass, sculptures, trees, background objects, flying objects, vehicles, robots, and props that appear in the sub-level.

Step 382: displaying settlement information about the first sub-level on the level screen in response to the virtual character passing the tail position of the first sub-level.

In response to the virtual character passing the tail position of the first sub-level, the terminal can display the settlement information about the first sub-level on the level screen by using head up display (HUD) information, pop-up prompt information or prompt information that moves with the virtual character.

By way of example, the HUD information, the pop-up prompt information or prompt information that moves with the virtual character does not affect the control of the virtual character. That is, in the process of displaying the HUD information, pop-up prompt information or prompt information that moves with the virtual character, the user may continue to control the virtual character to move or attack. In the case of displaying the settlement information using the prompt information that moves with the virtual character, the displayed settlement information moves with the moving direction of the virtual character. For example, prompt information that moves with the virtual character is displayed above the head of the virtual character, and the position relative to the virtual character remains unchanged during the movement of the virtual character.

By way of example, the HUD information, pop-up prompt information, or prompt information that moves with the virtual character is canceled after being displayed for a preset period of time. Alternatively, the display of the HUD information, pop-up prompt information, or the prompt information that moves with the virtual character is canceled in response to receiving a human-machine interaction of the user on an area other than the HUD information, pop-up prompt information, or the prompt information that moves with the virtual character.

The settlement information of the first sub-level includes, but is not limited to: settlement information of at least one level parameter of the virtual character in gold, experience, props and rewards of the first sub-level.

Step 384: controlling the virtual character to keep moving until moving to the second sub-level.

In the process of displaying the settlement information of the first sub-level, the terminal controls the virtual character to keep moving until moving to the second sub-level in response to the user-triggered moving operation. Optionally, the first sub-level is adjacent to the second sub-level. There is a transitional connection relationship between virtual environments of the first sub-level and the second sub-level. There is an adjacent position between the first sub-level and the second sub-level. The process of the terminal controlling the movement of the virtual character from the first sub-level to the second sub-level according to the moving operation is performed continuously, and no pause occurs during the movement. In addition, during the movement, the terminal displays the above-mentioned adjacent position. In that case, the level screen displayed by the terminal includes both a portion of the first sub-level and a portion of the second sub-level, namely, two sides of the adjacent position are the first sub-level and the second sub-level respectively. Optionally, there is a difference in the contents displayed on two sides of the adjacent position on the level screen. The difference includes at least one of difference in a virtual environment, difference in an enemy unit, difference in movement logic or attack logic of the enemy unit, difference in a neutral unit, difference in a flight vehicle, difference in a ground vehicle, difference in a robot carrier, and difference in a virtual object.

In summary, according to the method provided by this embodiment, by displaying the settlement information of the first sub-level, users can feel the end of the first sub-level without perceiving the loading process of the second sub-level. The loading process of the second sub-level will not interrupt the user's operations within the first sub-level, so that when the user operates the virtual character to enter the second sub-level from the first sub-level, there is no loading switching process of a conventional level switching process, and there is substantially no different from the operations in the conventional levels. In this way, a very long level experience can be provided by less resource consumption.

In event that a plurality of sub-levels are included in one level, a first sub-level may be an i-th sub-level of the plurality of sub-levels, and a second sub-level may be an (i+1)-th sub-level of the plurality of sub-levels, i being a positive integer. That is, the first sub-level and the second sub-level are two adjacent sub-levels of the plurality of sub-levels.

In an exemplary embodiment, there is at least one sub-level split into multiple level mods. Assuming that the first sub-level includes n level mods connected end-to-end, the level mods are the basic units for composing the sub-level. Step 340 may optionally include the following sub-steps, as shown in FIG. 8:

Step 341: controlling the virtual character to move in the i-th level mod of the first sub-level in response to the moving operation.

The mod resources of each level mod include: logic resources and art resources.

Logical resources include code resources related to running logic. Logical resources include, but are not limited to: at least one of a triggering logic of an enemy unit, a movement logic of the enemy unit, an attack logic of the enemy unit, an appearance logic of a neutral unit, an action logic of the neutral unit, a release logic of a flight prop, a release logic of a ground vehicle, a release logic of a robot carrier, and a reward drop logic. The embodiments of this application do not define the specific types of logic resources.

The art resources include: Model resources and map resources of a 3D virtual model. The 3D virtual model includes: at least one of buildings, grass, sculptures, trees, background objects, flying objects, vehicles, robots, and props that appear in the sub-level.

The same level mod can be directly multiplexed in multiple sub-levels or multiple levels without modification; It is also possible that only a small portion of the logical resources and/or the art resources are modified before being multiplexed in multiple sub-levels or multiple levels.

Step 342: loading a (i+1)-th level mod in response to the virtual character moving to the trigger position of the (i+1)-th level mod in the first sub-level.

By way of example, the trigger position for the (i+1)-th level mod is a designated position or an arbitrary position in the i-th level mod. For example, as soon as the virtual character enters the i-th level mod, the mod resource of the (i+1)-th level mod starts to be loaded.

Step 343: controlling the virtual character to move from the i-th level mod to the (i+1)-th level mod.

Figures 9, 10, 11:
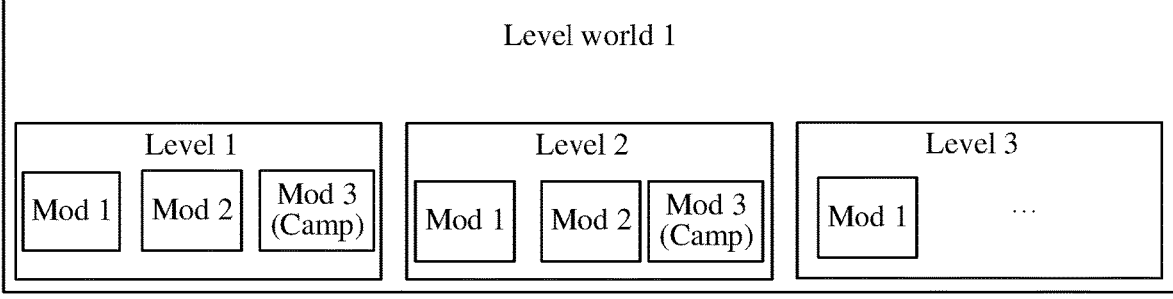
FIG. 9 illustrates an interface diagram of a method for displaying a level screen provided by an exemplary embodiment.
FIG. 10 illustrates an interface diagram of a method for displaying a level screen provided by an exemplary embodiment.
FIG. 11 illustrates an interface diagram of a method for displaying a level screen provided by an exemplary embodiment.

With reference to FIG. 9, in an initial state, the virtual character is in the level mod 1. When the position 1 of the virtual character is at the trigger position of the level mod 2, the terminal loads the mod resource of the level mod 2; when the position 2 of the virtual character is at the trigger position of the level mod 3, the terminal loads the mod resource of the level mod 3; and when the position 3 of the virtual character is at the trigger position of the level mod 4, the terminal loads the mod resource of the level mod 4.

Since the distance that the virtual character moves backward is limited, for example, no more than one level mod, when a historical loaded level mod satisfies the release condition, the terminal releases the historical loaded level mod.

Step 344: loading a (i+3)-th level mod in response to the virtual character moving to the trigger position of the (i+3)-th level mod in the first sub-level.

Step 345: releasing the i-th level mod in a case of successfully loading the (i+3)-th level mod.

Releasing the level mod means that the terminal no longer loads the level mod. By way of example, after the mod resources of the level mod 4 are loaded, the mod resources of the level mod 1 are released.

By the same reasoning, it is assumed that the first sub-level and the second sub-level respectively include at least one level mod. The above-mentioned step 360 can be implemented as: loading a first level mod of the second sub-level in response to the virtual character moving to the trigger position of the second sub-level in the last level mod of the first sub-level.

In event that the first sub-level includes n level mods connected end-to-end, optionally, the distance between the trigger position of the above-mentioned second sub-level and the camp position of the first sub-level is less than a threshold, where the camp position is a position in the last level mod of the first sub-level, and the threshold is set by the client. Optionally, the camp position displays a display element that reflects the location as a camp, such as a virtual tent, a virtual campfire, and a virtual house. By way of example, the first sub-level includes 5 level mods, and the camp position of the first sub-level is in the level mod 5.

In event that the first sub-level and the second sub-level each include at least one level mod, optionally, in response to the virtual character moving to the trigger position of the second sub-level in the last level mod of the first sub-level, the terminal loads the first level mod of the second sub-level, thereby displaying the second sub-level on the level screen.

In summary, according to the method provided by the embodiment, by splitting a level into a plurality of sub-levels, a terminal only need to load a small amount of mod resources of the level mods to operate normally, without loading all the level resources of the whole sub-level, further reducing the requirements for the computing performance and caching performance of the terminal.

According to the method provided by the embodiment, computing resources and cache resources can be recycled as soon as possible by releasing a historically loaded level mod when the historically loaded level mod satisfies a release condition, improving resource utilization efficiency on the terminal.

The above-mentioned scheme is illustrated below with an exemplary embodiment.

Level splitting and sub-level logic:

With exemplary reference to FIG. 10, level 1 may be split into two sub-levels: a sub-level 1 and a sub-level 2. The sub-level 1 can be further split into a mod 1-1 and a mod 1-2. The sub-level 2 can be further split into a mod 2-1, a mod 2-2 and a mod 2-3. The mod 1-1 has a start record point of sub-level 1 and is also the birth point of the virtual character at level 1. The virtual character is born at the start record point of sub-level 1 after entering level 1. The mod 1-2 has a corresponding record point 1, and the end of the module 1-2 is set with a level transmission point of the sub-level 2, namely, the trigger position of the sub-level 2. The mod 2-1 has a start record point of the sub-level 2; The mod 2-2 has a corresponding record point 1; The mod 2-3 has a corresponding record point 2, and the end of the module 2-3 is set with a level transmission point of a next level or a next sub-level.

It should be noted that it is also possible in some embodiments to split a level directly into multiple mods. With exemplary reference to FIG. 11, a level world 1 contains several levels: a level 1, a level 2, and a level 3. The level 1 includes a mod 1, a mod 2 and a mod 3 (camp). The level 2 includes a mod 1, a mod 2 and a mod 3 (camp). The mod 3 includes the mod 1. The mod 3 of the level 1 may communicate with the mod 1 of the level 2. The mod 3 of the level 2 may communicate with the mod 1 of the level 3. The destination of each level is set with a camp, which is the settlement point for the current level and trigger point for the next level.

Reason for Splitting the Level:

The length of an original level is too long, and it needs to be divided into multiple sub-levels to meet the player's demand for the length of time. (60-90 seconds)

The original level refers to a conventional level in a 2D horizontal shooting game.

Splitting Mode:

When the original level is cut into multiple sub-levels, the record point in the level is used as the marker to divide the level.

Passing a record point is equivalent to clearing the previous sub-level, which will trigger the level settlement. The level settlement is not blocked, nor does it jump out of a single level. The settlement information is presented only through the UI in the level, while the player is not affected during the settlement process and can continue to operate the virtual character.

Entry and Exit of the Sub-Level:

Entering the Sub-Level:

A large level map is a player's screening interface. An area on the large level map corresponds to a particular sub-level. Clicking on this area on the large map will directly enter the corresponding sub-level.

When entering a sub-level, the player is born at the record point corresponding to the sub-level, and cannot return the area before the record point.

When entering the sub-level, the stamina required for that sub-level is deducted (the main reason for this rule is that our level rewards will be adjusted to be dropped in the level). When exiting the record point, the stamina of the next sub-level is deducted. The stamina is an attribute value of the virtual character.

Exit the Level:

There are two ways for a normal level exit:

Exit in the level: exit from an in-progress level.

Exit the level after clearing the whole level: After the whole level is cleared, an interactive UI that actively exits the level appears.

Experience and Rewards Dropped:

Experience Obtaining:

Each sub-level is configured with the corresponding available experience. The level experience includes two parts: clearance experience and in-progress experience (with upper limit).

The in-progress experience can be obtained in many ways, such as killing the enemy, picking up props, and completing tasks. The above sections can be configured with different experiences.

There is an upper limit in the in-progress experience for each level that is no longer available once it is reached.

Rewards Dropped:

The level reward can be determined by a corresponding random logic when entering the sub-level, and then randomly dropped during the clearance process.

Rewards picked up in the level that dropped off are placed in a temporary backpack; when the player normally exits the level, rewards in the temporary backpack are available.

Upgrade in the Level:

Experience can be obtained in the level process, so the player may (certainly) upgrade in the level.

The UI in the level can show the player's upgraded experience bar.

Upgrade Feedback in a Single Game:

We want to give strong feedback to the player immediately after an upgrade in the level, especially at a novice stage.

State full: After the upgrade, all the protagonist's HP, ammo, skill CD, and so on can be returned.

Upgrade skills: If the skill upgrade condition required by the system is met after the upgrade, the skill upgrade can be performed directly in the level and be effective immediately.

Obtaining weapons/dual weapons: In the novice phase, the weapon is unlocked after the upgrade and the dual weapon can be immediately armed and used. The weapon is a virtual prop in the game.

Obtaining vehicles: At the novice stage, the vehicle can be used immediately after being unlocked after the upgrade.

There is a system unlock after the upgrade in the level, and there is a corresponding UI prompt in a single game.

Figure 12:
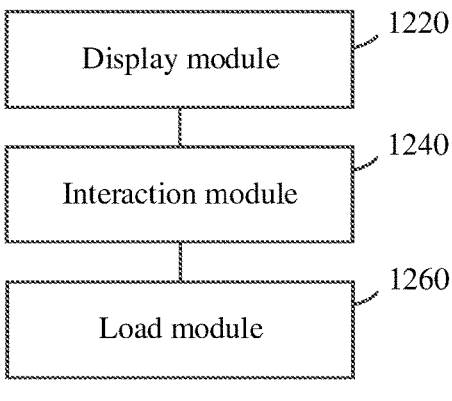
FIG. 12 illustrates a block diagram of an apparatus for displaying a level screen provided by an exemplary embodiment.

FIG. 12 illustrates a block diagram of an apparatus for displaying a level screen provided by an exemplary embodiment of this application, the apparatus including:

a display module 1220 configured to display the level screen, the level screen displaying a virtual character located in a first sub-level;

an interaction module 1240 configured to control the virtual character to move in the first sub-level in response to a moving operation; and a load module 1260 configured to load a second sub-level in response to the virtual character moving to a trigger position of the second sub-level in the first sub-level; and where the interaction module 1240 is configured to control the virtual character to move from the first sub-level to the second sub-level.

In an optional design of this embodiment, the trigger position of the second sub-level is the tail position of the first sub-level; and the interaction module 1240 is configured to display settlement information about the first sub-level on the level screen in response to the virtual character passing the tail position of the first sub-level; and control the virtual character to keep moving until moving to the second sub-level.

In an optional design of the embodiment, the interaction module 1240 is configured to display, by using HUD information, pop-up prompt information, or prompt information that moves with the virtual character, settlement information about the first sub-level on the level screen in response to the virtual character passing the tail position of the first sub-level.

In an optional design of the embodiment, the display module 1220 is configured to display an adjacent position of the first sub-level and the second sub-level in the process of controlling the virtual character to move from the first sub-level to the second sub-level.

In an optional design of the embodiment, the first sub-level includes n level mods connected end-to-end, the level mods being basic units for composing the sub-levels;

the interaction module 1240 is configured to control the virtual character to move in an i-th level mod of the first sub-level in response to the moving operation;

the load module 1260 is configured to load a (i+1)-th level mod in response to the virtual character moving to the trigger position of the (i+1)-th level mod in the first sub-level; and the interaction module 1240 is configured to control the virtual character to move from the i-th level mod to the (i+1)-th level mod.

In an optional design of the embodiment, a distance between the trigger position of the second sub-level and a camp position of the first sub-level is less than a threshold, the camp position being a position in the last level mod of the first sub-level.

In an optional design of the embodiment, the load module 1260 is configured to release a historically loaded level mod in response to the historically loaded level mod satisfying a release condition.

In an optional design of the embodiment, the load module 1260 is configured to load a (i+3)-th level module in response to the virtual character moving to the trigger position of the (i+3)th level mod in the first sub-level; and release the i-th level mod in a case of successfully loading the (i+3)-th level mod.

In an optional design of the embodiment, the first sub-level and the second sub-level respectively include at least one level mod; and the load module 1260 is configured to load a first level mod of the second sub-level in response to the virtual character moving to the trigger position of the second sub-level in the last level mod of the first sub-level.

An embodiment of this application further provides a computer device, including: a processor and a memory. The memory stores at least one instruction, at least one program, a code set, or an instruction set. The at least one instruction, the at least one program, the code set, or the instruction set is loaded and executed by the processor to implement the pose determining method according to the foregoing method embodiments.

Figure 13:
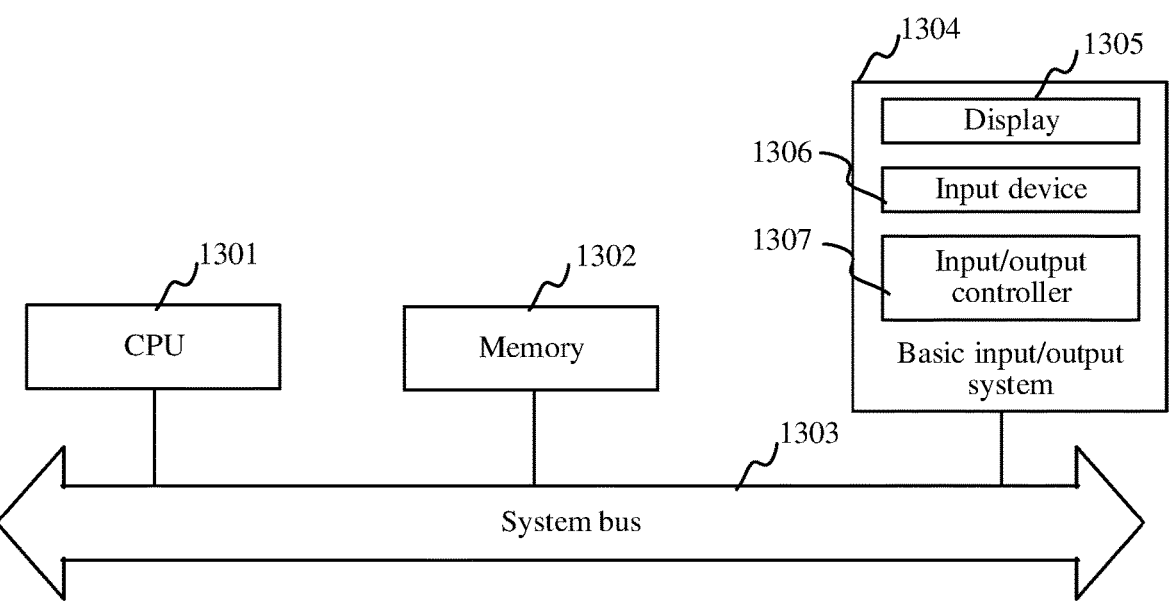
FIG. 13 illustrates a block diagram of a computer device provided by an exemplary embodiment.

FIG. 13 is a schematic structural diagram of a computer device according to an exemplary embodiment. the computer device 1300 includes a central processing unit (CPU) 1301, a memory 1302, and a system bus 1303 connecting the memory 1302 and the central processing unit 1301. The computer device 1300 further includes a basic input/output system (I/O system) 1304 configured to transmit information between components in the computer device.

The basic I/O system 1304 includes a display 1305 configured to display information and an input device 1306 such as a mouse or a keyboard that is configured to allow a user to input information. The display 1305 and the input device 1306 are connected to an I/O controller 1307 of the system bus 1303, to be connected to the CPU 1301. The basic I/O system 1304 may further include the input and output controller 1307 to be configured to receive and process inputs from a plurality of other devices such as a keyboard, a mouse, and an electronic stylus.

The storage device 1302 is connected to the central processing unit 1301 by using a storage controller (not shown) connected to the system bus 1303. The storage device 1302 and an associated computer-readable medium provide non-volatile storage for the computer device 1300. That is, the storage device 1302 may include a computer-readable medium (not shown) such as a hard disk or a compact disc read only memory (CD-ROM) drive.

In general, the computer-readable medium may include a computer storage medium and a communications medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a magnetic cassette, a magnetic tape, a magnetic disk memory, or another magnetic storage device. Certainly, those skilled in the art may learn that the computer storage medium is not limited to the above.

The memory further includes one or more programs. The one or more programs are stored in the memory. The CPU 1301 executes the one or more programs to implement all or some steps of any method for displaying a level screen shown in FIG. 3, FIG. 4, and FIG. 13.

This application further provides a computer-readable storage medium, the storage medium storing at least one instruction, at least one program, a code set or an instruction set, and the at least one instruction, the at least one program, the code set or the instruction set being loaded and executed by a processor to implement the method for displaying a level screen according to the foregoing method embodiments. By way of example, such computer-readable storage media exists in the form of an optical disc, a USB flash disk, a memory card, and other media capable of storing the above-mentioned information. In some implementations, the computer-readable storage medium exists in the form of a game memory card, and only a computer device associated with the game memory card supports reading of the memory card, thereby realizing the execution of the method for displaying a level screen as previously described.

This application further provides a chip, including a programmable logic circuit and/or a program instruction, the chip being configured to be run on a computer device to implement the method for displaying a level screen provided by the above-mentioned method embodiment.

This application further provides a computer program product including an instruction. When run on a computer device, the computer program product causes the computer device to perform the method for displaying a level screen according to the foregoing aspects.

The sequence numbers of the foregoing embodiments of this application are merely for description purpose, and are not intended to indicate the preference among the embodiments.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made within the spirit and principle of this application shall fall within the protection scope of this application.

What is claimed is:

1. A method for displaying a level screen, applied to a terminal device, a level provided by the terminal device comprising at least two sub-levels, the method comprising:
  loading a first sub-level without loading a second sub-level;
  displaying the level screen, the level screen displaying a virtual character located in the first sub-level;
  controlling the virtual character to move in the first sub-level in response to a moving operation;
  loading the second sub-level in response to the virtual character moving to a trigger position of the second sub-level in the first sub-level; and
  controlling the virtual character to move from the first sub-level to the second sub-level.

2. The method according to claim 1, wherein the trigger position of the second sub-level is a tail position of the first sub-level; and the controlling the virtual character to move from the first sub-level to the second sub-level comprises:
  displaying settlement information about the first sub-level on the level screen in response to the virtual character passing the tail position of the first sub-level; and
  controlling the virtual character to keep moving until moving to the second sub-level.

3. The method according to claim 2, wherein the displaying settlement information about the first sub-level on the level screen in response to the virtual character passing the tail position of the first sub-level comprises:
  displaying, by using head up display (HUD) information, pop-up prompt information, or prompt information that moves with the virtual character, settlement information about the first sub-level on the level screen in response to the virtual character passing the tail position of the first sub-level.

4. The method according to claim 1, wherein the method further comprises:
  displaying an adjacent position of the first sub-level and the second sub-level in a process of controlling the virtual character to move from the first sub-level to the second sub-level.

5. The method according to claim 1, wherein the first sub-level comprises n level mods connected end-to-end, the level mods being basic units for composing the sub-levels, and n being a positive integer; and
  the controlling the virtual character to move in the first sub-level in response to a moving operation comprises:
  controlling the virtual character to move in an i-th level mod of the first sub-level, i being a positive integer not greater than n, in response to the moving operation;
  loading a (i+1)-th level mod in response to the virtual character moving to the trigger position of the (i+1)-th level mod in the first sub-level; and
  controlling the virtual character to move from the i-th level mod to the (i+1)-th level mod.

6. The method according to claim 5, wherein a distance between the trigger position of the second sub-level and a camp position of the first sub-level is less than a threshold, the camp position being a position in the last level mod of the first sub-level.

7. The method according to claim 5, further comprising:
  releasing a historically loaded level mod in response to the historically loaded level mod satisfying a release condition.

8. The method according to claim 7, wherein the releasing a historically loaded level mod in response to the historically loaded level mod satisfying a release condition comprises:
  loading a (i+3)-th level mod in response to the virtual character moving to the trigger position of the (i+3)-th level mod in the first sub-level; and
  releasing the i-th level mod in a case of successfully loading the (i+3)-th level mod.

9. The method according to claim 1, wherein the first sub-level and the second sub-level respectively comprise at least one level mod; and
  the loading a second sub-level in response to the virtual character moving to a trigger position of the second sub-level in the first sub-level comprises:
  loading a first level mod of the second sub-level in response to the virtual character moving to the trigger position of the second sub-level in the last level mod of the first sub-level.

10. An apparatus for displaying a level screen, a level provided by the apparatus comprising at least two sub-levels, the apparatus comprising:
  a memory storing a plurality of instructions; and
  a processor configured to execute the plurality of instructions, and upon execution of the plurality of instructions, is configured to:
  load a first sub-level without loading a second sub-level;
  cause a display to display the level screen, the level screen displaying a virtual character located in the first sub-level;
  control the virtual character to move in the first sub-level in response to a moving operation
  load the second sub-level in response to the virtual character moving to a trigger position of the second sub-level in the first sub-level; and control the virtual character to move from the first sub-level to the second sub-level.

11. The apparatus according to claim 10, wherein the trigger position of the second sub-level is a tail position of the first sub-level; and the processor, upon execution of the plurality of instructions, is further configured to:

display settlement information about the first sub-level on the level screen in response to the virtual character passing the tail position of the first sub-level; and control the virtual character to keep moving until moving to the second sub-level.

12. The apparatus according to claim 11, wherein the processor, upon execution of the plurality of instructions, is further configured to:

cause the display to display, by using HUD information, pop-up prompt information, or prompt information that moves with the virtual character, settlement information about the first sub-level on the level screen in response to the virtual character passing the tail position of the first sub-level.

13. The apparatus according to claim 10, wherein, the processor, upon execution of the plurality of instructions, is further configured to cause the display to:

display an adjacent position of the first sub-level and the second sub-level when controlling the virtual character to move from the first sub-level to the second sub-level.

14. The apparatus according to claim 10, wherein, the first sub-level comprises n level mods connected end-to-end, the level mods being basic units for composing the sub-levels, and wherein the processor, upon execution of the plurality of instructions, is further configured to:

control the virtual character to move in an i-th level mod of the first sub-level in response to the moving operation;

load a (i+1)-th level mod in response to the virtual character moving to the trigger position of the (i+1)-th level mod in the first sub-level; and control the virtual character to move from the i-th level mod to the (i+1)-th level mod.

15. The apparatus according to claim 14, wherein, a distance between the trigger position of the second sub-level and a camp position of the first sub-level is less than a threshold, the camp position being a position in the last level mod of the first sub-level.

16. The apparatus according to claim 14, wherein the processor, upon execution of the plurality of instructions, is further configured to:

release a historically loaded level mod in response to the historically loaded level mod satisfying a release condition.

17. The apparatus according to claim 16, wherein the processor, upon execution of the plurality of instructions, is further configured to:

load a (i+3)-th level mod in response to the virtual character moving to the trigger position of the (i+3)th level mod in the first sub-level; and release the i-th level mod in a case of successfully loading the (i+3)-th level mod.

18. The apparatus according to claim 10, wherein the first sub-level and the second sub-level respectively comprise at least one level mod; and the processor, upon execution of the plurality of instructions, is further configured to:

load a first level mod of the second sub-level in response to the virtual character moving to the trigger position of the second sub-level in the last level mod of the first sub-level.

19. A non-transitory computer-readable storage medium storing a plurality of instructions executable by a processor, and when executed by the processor, the plurality of instructions is configured to cause the processor to:

load a first sub-level without loading a second sub-level;

cause a display to display a level screen, the level screen displaying a virtual character located in the first sub-level;

control the virtual character to move in the first sub-level in response to a moving operation; and load the second sub-level in response to the virtual character moving to a trigger position of the second sub-level in the first sub-level; and control the virtual character to move from the first sub-level to the second sub-level.

20. The non-transitory computer-readable storage medium according to claim 19, wherein the trigger position of the second sub-level is a tail position of the first sub-level, and the plurality of instructions, when executed by the processor, is further configured to cause the processor to:

cause the display to display settlement information about the first sub-level on the level screen in response to the virtual character passing the tail position of the first sub-level; and control the virtual character to keep moving until moving to the second sub-level.

\* \* \* \* \*